(12) United States Patent
Orlando et al.

(10) Patent No.: US 7,007,488 B2
(45) Date of Patent: Mar. 7, 2006

(54) MODULATED FLOW TURBINE NOZZLE

(75) Inventors: Robert Joseph Orlando, West Chester, OH (US); Thomas Ory Moniz, Loveland, OH (US); John Christopher Brauer, Lawrenceburg, IN (US); Ian Francis Prentice, Cincinnati, OH (US); Erich Alois Krammer, West Chester, OH (US); James Patrick Dolan, Cincinnati, OH (US); Robert Alan Frederick, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/885,147

(22) Filed: Jul. 6, 2004

(65) Prior Publication Data

US 2006/0005546 A1   Jan. 12, 2006

(51) Int. Cl.
*F02C 7/12*    (2006.01)
(52) U.S. Cl. .......................................... 60/782; 60/806
(58) Field of Classification Search .................. 60/806, 60/782; 415/115; 416/96 R, 97 R, 96 A
See application file for complete search history.

(56) References Cited

U.S. PATENT DOCUMENTS

| | | | |
|---|---|---|---|
| 2,859,935 A | 11/1958 | Roesch | |
| 3,045,965 A | 7/1962 | Bowmer | |
| 3,475,107 A | 10/1969 | Auxier | |
| 3,726,604 A * | 4/1973 | Helms et al. | 415/115 |
| 4,187,054 A | 2/1980 | Landis et al. | |
| 5,207,556 A | 5/1993 | Frederick et al. | |
| 5,358,374 A | 10/1994 | Correia et al. | |
| 5,488,825 A | 2/1996 | Davis et al. | |
| 5,645,397 A * | 7/1997 | Soechting et al. | 415/115 |
| 5,741,117 A | 4/1998 | Clevenger et al. | |
| 5,997,245 A | 12/1999 | Tomita et al. | |
| 6,065,928 A | 5/2000 | Rieck et al. | |
| 6,067,792 A * | 5/2000 | Tubbs | 60/806 |
| 6,398,488 B1 | 6/2002 | Solda et al. | |
| 6,564,557 B1 * | 5/2003 | Dailey | 60/806 |
| 6,931,859 B1 * | 8/2005 | Morgan et al. | 60/782 |

FOREIGN PATENT DOCUMENTS

EP    0 315 486 A2    5/1989

* cited by examiner

*Primary Examiner*—Ehud Gartenberg
(74) *Attorney, Agent, or Firm*—William S. Andes; Francis L. Conte

(57) ABSTRACT

A gas turbine engine includes a compressor powered by a turbine. The turbine includes a nozzle having vanes extending between outer and inner bands. Each vane includes an internal cooling plenum and a bypass tube extending through the bands. First and second manifolds surround the outer band and are disposed in flow communication with the plenums and bypass tubes, respectively. A bleed circuit joins the compressor to the manifolds for providing pressurized air thereto. A control valve modulates airflow to the first manifold and in turn through the cooling plenums of the vanes.

32 Claims, 4 Drawing Sheets

MODULATED FLOW TURBINE NOZZLE

BACKGROUND OF THE INVENTION

The present invention relates generally to gas turbine engines, and, more specifically, to turbine nozzles therein.

In a gas turbine engine air is pressurized in a compressor and mixed with fuel in a combustor for generating hot combustion gases. A high pressure turbine (HPT) follows the combustor for extracting energy from the combustion gases to power the compressor. A low pressure turbine (LPT) follows the HPT and extracts additional energy from the gases to power an upstream fan in the typical turbofan gas turbine engine application. Alternatively, the LPT may drive an external drive shaft for marine and industrial applications.

The HPT includes one or more turbine nozzles for directing the combustion gases into corresponding stages of turbine rotor blades extending radially outwardly from supporting rotor disks. The nozzle stator vanes and the turbine rotor blades are typically hollow and contain internal cooling circuits therein through which is circulated pressurized air bled from the compressor for use in cooling the metal material thereof during operation.

The art is crowded with various configurations for cooling the nozzle stator vanes and turbine rotor blades and their adjacent components which are subject to heating by the hot combustion gases which flow through the turbine flowpaths during operation. For example, the cooling air is bled from the compressor and channeled through one circuit along the rotor disks and into the individual rotor blades through inlets provided in the mounting dovetails thereof supported in the perimeter of the rotor disks.

The individual blade airfoils typically have multiple radial flow passages therein for providing internal impingement cooling or serpentine cooling, or both, inside the airfoil typically with small turbulator ribs disposed along the inner surface of the airfoil for tripping the cooling flow to increase its heat transfer performance. The spent cooling air is discharged through various rows of film cooling holes extending through the pressure and suction sides, or both, of the airfoil in various configurations.

Correspondingly, additional air may also be bled from the compressor in another circuit to supply the turbine nozzles with cooling air, typically through their outer bands. The first stage turbine nozzle is subjected to the hottest temperature combustion gases from the combustor and typically includes multiple cooling passages or cavities inside the individual nozzle vanes with associated internal impingement baffles for increasing the cooling performance of the pressurized air.

In a two stage HPT, the second stage nozzle may also be internally cooled by the compressor bleed air, and may also include an internal impingement baffle therein for enhancing cooling performance.

In both nozzle stages, the spent cooling air is typically discharged through various rows of film cooling holes in the pressure or suction sides, or both, of the vane airfoils for return to the main combustion gas flowpath during operation.

Since the second stage turbine nozzle is disposed axially between the first and second stage rotor blades and their corresponding rotor disks, a portion of the cooling air channeled through the vanes is typically discharged through the inner band of the nozzle for providing purge cooling flow in the forward and aft cavities defined with the corresponding rotor disks of the first and second stages. A honeycomb seal is typically supported from the inner band and cooperates with an annular seal having labyrinth seal teeth disposed closely adjacent thereto, with the forward and aft rotor cavities being defined on the opposite sides of the labyrinth seal bounded by the corresponding rotor disks.

In this way, cooling air channeled through the nozzle vanes may be discharged into the forward rotor cavity for cooling the aft face of the first stage rotor with the spent purge air leaking past the labyrinth seal teeth for then purging the aft rotor cavity and correspondingly cooling the forward face of the second stage rotor disk.

The various cooling configurations provided for the stator vanes, turbine blades, purge cavities, and other components bounding the hot combustion gas flowpath are typically tailored to the different operating environments thereof for maximizing cooling effectiveness while minimizing the use of compressor bleed air. Any air bled from the compressor which is not used in the combustion process decreases the overall efficiency of the gas turbine engine and requires more fuel burn.

In aircraft engine applications fuel consumption is always a paramount design objective, with modern aircraft turbofan engines designed therefor being constantly improved for minimizing fuel consumption. Since the HPT is subject to the hottest combustion gases during operation, reducing cooling air requirements therefor is a significant challenge in view of the hostile temperature environment of this section of the engine, and in view of the mature design thereof.

Accordingly, it is desired to further improve cooling efficiency in high pressure turbines for correspondingly further improving performance and efficiency of the gas turbine engine.

BRIEF DESCRIPTION OF THE INVENTION

A gas turbine engine includes a compressor powered by a turbine. The turbine includes a nozzle having vanes extending between outer and inner bands. Each vane includes an internal cooling plenum and a bypass tube extending through the bands. First and second manifolds surround the outer band and are disposed in flow communication with the plenums and bypass tubes, respectively. A bleed circuit joins the compressor to the manifolds for providing pressurized air thereto. A control valve modulates airflow to the first manifold and in turn through the cooling plenums of the vanes.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
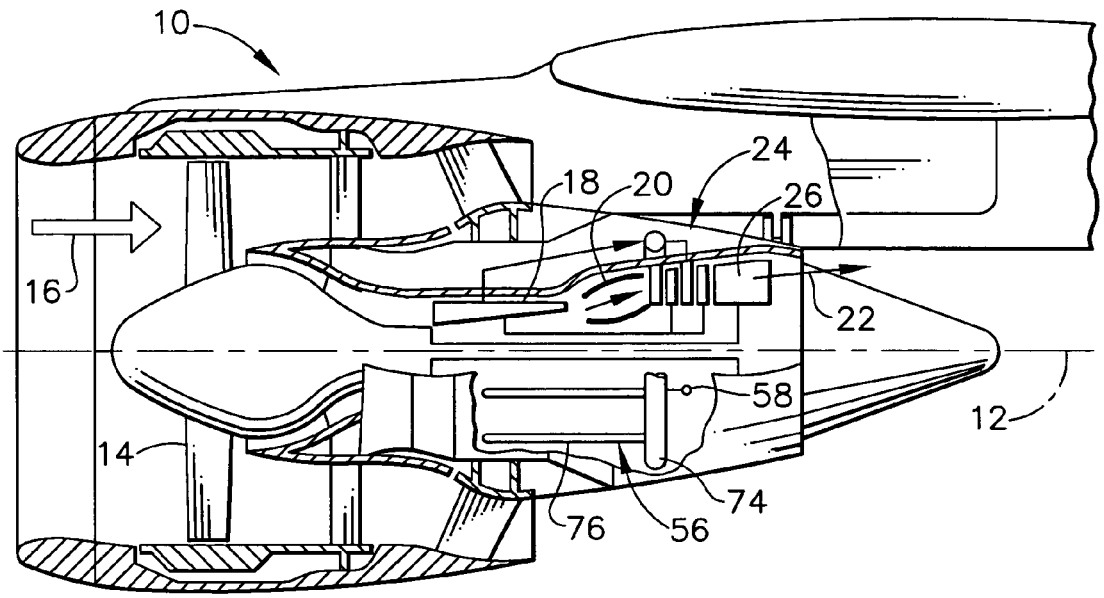
FIG. 1 is a partly sectional axial view of an exemplary turbofan aircraft engine mounted to the wing of an aircraft.

FIG. 1 illustrates an exemplary turbofan gas turbine engine 10 suitably mounted by a pylon to the wing of an aircraft for propulsion thereof in flight. The engine is axisymmetrical about a longitudinal or axial centerline axis 12, and is primarily conventional in configuration and operation.

The engine includes a fan 14 and corresponding low pressure or booster compressor which first receive ambient air 16 for pressurizing thereof. An inner portion of the air is channeled through the booster compressor into the core engine for additional pressurization in a multistage axial compressor 18. An outer portion of the fan air bypasses the core engine and is discharged through the fan outlet at the end of the surrounding fan nacelle for providing a majority of the propulsion thrust during operation.

The pressurized air from the compressor 18 is mixed with fuel and ignited in an annular combustor 20 for generating therein hot combustion gases 22. The combustion gases are discharged from the combustor into a high pressure turbine (HPT) 24 which extracts energy therefrom for powering the high pressure compressor 18 through a corresponding rotor shaft extending axially therebetween. A low pressure turbine (LPT) 26 follows the HPT and extracts additional energy from the combustion gases for powering the fan 14 and booster compressor by another rotor shaft extending axially therebetween.

Figure 2:
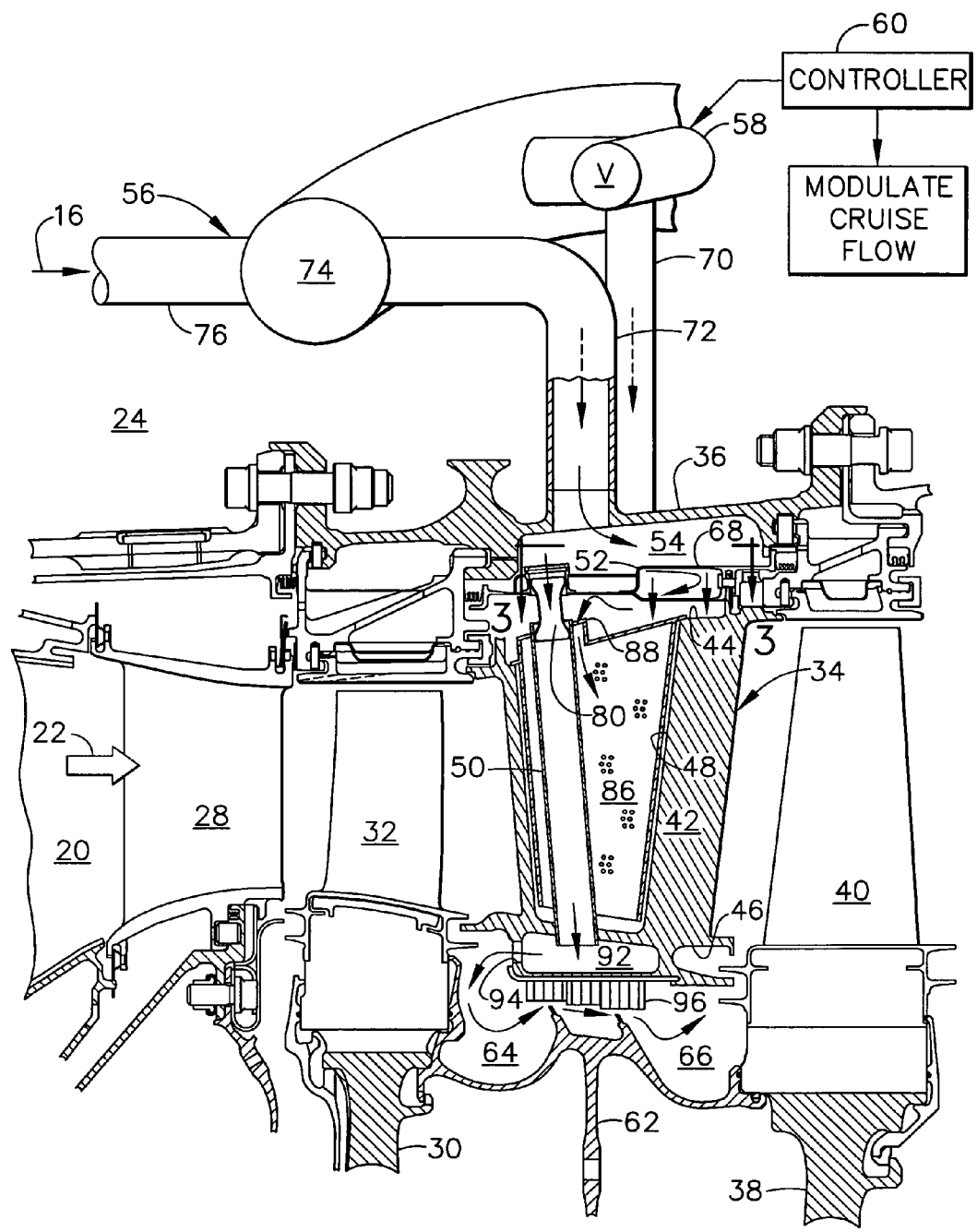
FIG. 2 is a partly sectional and schematic axial view through a portion of the high pressure turbine of the engine illustrated in FIG. 1.

The HPT 24 is illustrated in more detail in FIG. 2. The HPT includes a first stage nozzle 28 including a row of nozzle vanes supported in outer and inner bands in a conventional manner. A first stage rotor disk 30 follows the nozzle 28 and includes a row of first stage rotor blades 32 extending radially outwardly therefrom in another conventional manner.

A second stage turbine nozzle 34 follows the first stage blades and is suitably supported from a turbine casing or outer casing 36. A second stage rotor disk 38 follows the second stage nozzle and includes a row of second stage rotor blades 40 extending radially outwardly therefrom in a conventional manner.

During operation, the combustion gases 22 are discharged from the combustor and channeled by the two nozzles through the corresponding first and second stage rotor blades which extract energy therefrom for rotating the two disks 30,38 which in turn are suitably joined to the common drive shaft or rotor which rotates the corresponding rotor blades of the high pressure compressor 18 illustrated in FIG. 1 in a conventional manner. The various components of the two turbines include suitable cooling circuits therein for protecting the turbine components from the hot combustion gases generated during operation for ensuring a suitable long life of these components.

As indicated above, various cooling configurations may be used in the two turbines and surrounding components for maximizing cooling efficiency while minimizing the need for bleeding air from the compressor. However, it has been discovered that a significant reduction in bleed air requirements may be obtained by modifying the second stage turbine nozzle 34 as further disclosed hereinbelow.

More specifically, the second stage nozzle 34 illustrated in FIG. 2 includes a row of hollow nozzle vanes 42 extending radially between outer and inner bands 44,46. Each of the vanes has an internal cooling cavity or plenum 48 extending from root to tip of the vane between the two bands, and a radially elongate bypass tube 50 extends radially through the vane and the outer and inner bands.

An arcuate or annular first manifold 52 surrounds the outer band 44 and is disposed in flow communication with the several plenums 48 of the row of vanes. An arcuate or annular second manifold 54 preferably surrounds the first manifold 52, and is disposed in flow communication with the several bypass tubes 50 of the row of vanes. The second manifold 54 is preferably disposed radially outwardly of the inner first manifold 52 which provide two independent and separate flowpaths to the bypass tubes and cooling plenums of the vanes.

Figure 3:
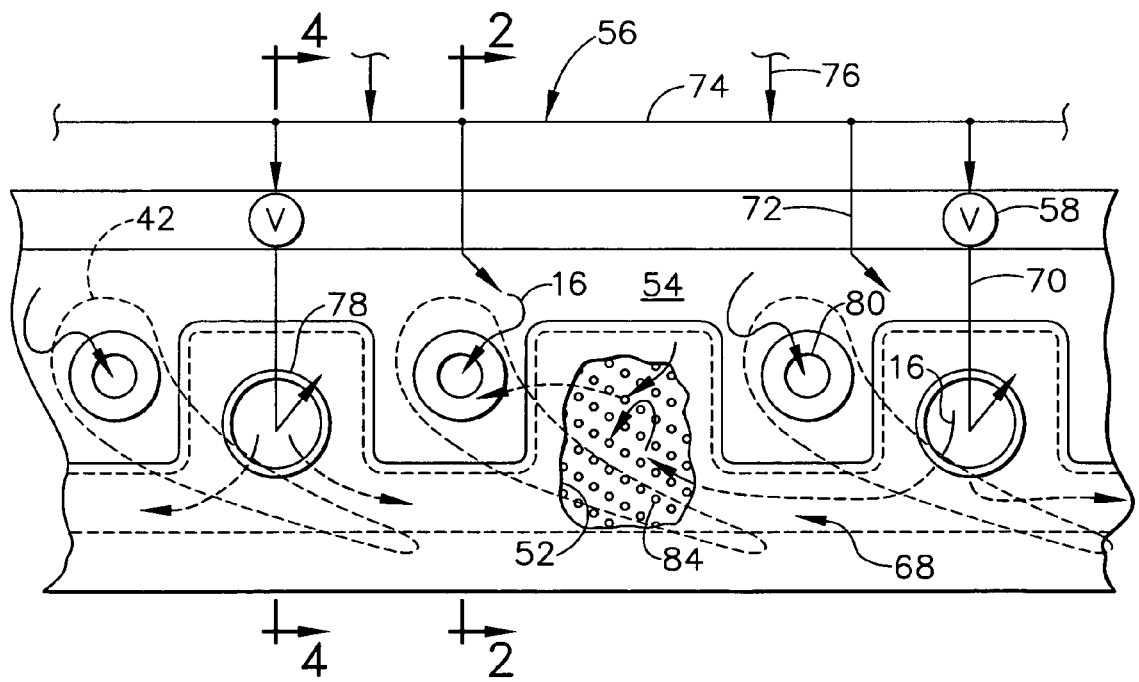
FIG. 3 is a planiform view of a portion of the second stage turbine nozzle illustrated in FIG. 2 and taken generally along line 3—3.

As shown in FIGS. 1–3 a supply or bleed circuit 56 is suitably disposed in flow communication between the high pressure compressor 18 and the two manifolds 52,54 for channeling pressurized bleed air 16 therebetween during operation. One or more control valves 58 are disposed between the bleed circuit 56 and the first manifold 52 for modulating flow of the pressurized cooling air 16 bled from the compressor into the vane plenums 48. The control valves 58 are suitably joined to the electrical controller 60 of the engine which itself may have any conventional configuration.

The two manifolds 52,54 illustrated in FIGS. 2 and 3 are disposed in parallel flow from the common bleed circuit 56 for receiving the same bleed air 16 therefrom under the same bleed pressure. The second manifold 54 is directly joined to the bleed circuit 56 without any flow modulation valves for providing full time or continuous flow of the pressurized cooling air thereto during all portions of engine operation. In contrast, the control valves 58 may be used to preferentially modulate the flowrate of the same bleed air 16 to the first manifold 52 for modulating the cooling air channeled inside the cooling plenums 48 of the individual vanes 42, and outside the bypass tubes.

The introduction of the two manifolds 52,54 and bypass tubes 50 permits further control of the cooling air for the second stage nozzle vanes themselves, as well as for subsequent purge air. As illustrated in FIG. 2, a conventional annular seal 62 having labyrinth seal teeth extending radially outwardly therefrom is disposed between the two rotor disks 30,38 and forms corresponding blade retainers therefor.

The first stage disk 30 is disposed axially forward of the second stage nozzle 34 to define with the annular seal 62 an annular forward cavity 64 therebetween. The second stage disk 38 is disposed aft of the second stage nozzle to define with the annular seal 62 an annular aft cavity 66 therebetween.

The bypass tubes 50 extend radially through the inner band 46 in flow communication with the forward cavity 64 for discharging the pressurized air channeled by the tubes into the forward cavity as purge air for cooling this region of the turbine, including the aft face of the first stage rotor disk. Some of the purge air then leaks past the labyrinth seal teeth due to the differential pressure experienced thereover for in turn purging the aft cavity 66 and cooling this region of the turbine, including the forward face of the second stage disk 38.

Accordingly, in a preferred method of use pressurized purge air 16 is channeled from the compressor radially through the bypass tubes 50 in the corresponding vanes 42 to purge both the forward and aft rotor cavities 64,66 located between the nozzle inner band 46 and the first and second rotor disks 30,38. Additionally, pressurized cooling air 16 is also channeled from the compressor and inside the plenums 48 of the individual vanes to internally cool the vanes independently from the purge air being channeled in parallel flow through the bypass tubes 50.

The control valves 58 may then be used for suitably modulating the flowrate of the cooling air 16 channeled inside the vanes 42 without modulating the flowrate of the purge air being channeled through the bypass tubes 50 in the same vanes.

The two manifolds 52,54 and bypass tubes 50 permit channeling of different portions of the same pressurized compressor bleed air as both purge air and cooling air from the compressor in parallel flowpaths through the vanes 42 isolated from each other through the outer band 44. The modulated first manifold airflow controls cooling inside the vane plenums, whereas the non-modulated second manifold airflow is provided full time through the bypass tubes 50 for continuously purging the forward and aft cavities 64,66.

It has been discovered that modulating the vane cooling flow during cruise operation of the engine can result in a significant performance improvement of the engine due to a reduction in cooling air requirements which in turn permits less fuel burn during operation. In particular, the amount of cooling air channeled into the individual vanes 42 may be reduced during cruise operation of engine while at the same time maintaining sufficient purge air flow to the forward and aft rotor cavities 64,66.

It is noted that the pressure profile of the combustion gases over the pressure and suction sides of the individual nozzle vanes 42 varies during operation, and the differential pressure between the bleed air and the combustion gases also varies during operation and in the different regions of the turbine including the vanes themselves and in the two purge cavities 64,66.

Full time or continuous purge airflow is desired to the forward and aft cavities 64,66, whereas modulation of the internal vane cooling flow may be used for significant performance improvement without comprising durability or life of the nozzle vanes themselves. The same source bleed air may be used to supply the two manifolds 52,54 in a relatively simple system which permits modulation of the vane cooling air without modulation of the cavity purge air.

The two manifolds 52,54 illustrated in FIG. 2 may be introduced in various configurations. For example, the second stage nozzle 34 may be conventionally mounted or supported from the annular outer casing 36 using suitable hangers in which the two manifolds may be defined. In the exemplary embodiment illustrated in FIG. 2, an annular sheet metal septum 68 extends axially between the opposite mounting hooks of the outer band, and is disposed radially between the outer casing 36 and the outer band 44 to separate radially the first and second manifolds 52,54.

Figure 4:
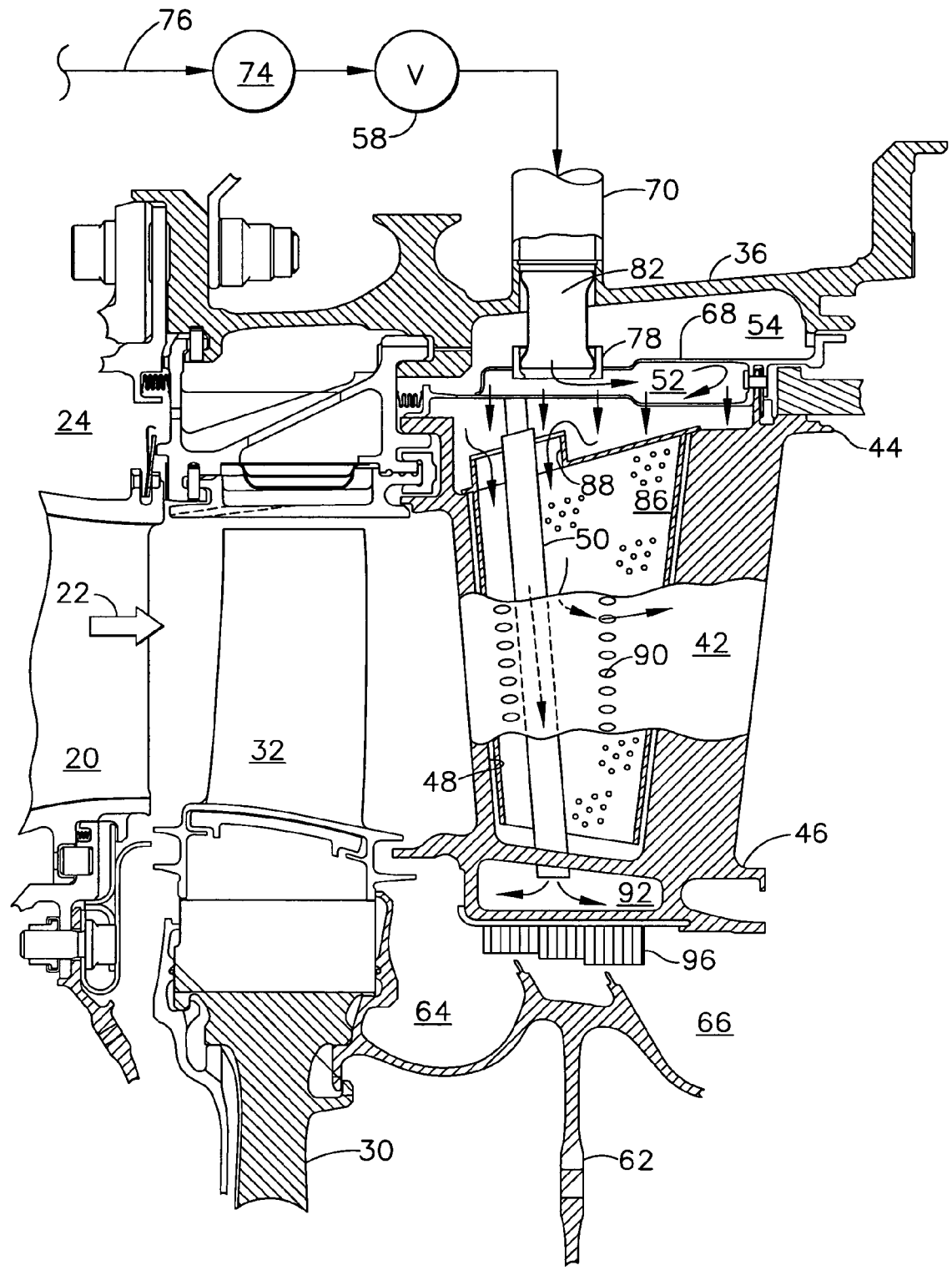
FIG. 4 is a partly sectional axial view, like FIG. 2, of the second stage nozzle in an axial plane taken generally line 4—4 of FIG. 3, with the FIG. 2 section being taken generally along line 2—2 thereof.

As shown in FIGS. 2–4, the bleed circuit 56 preferably includes a plurality of first supply tubes 70 extending radially through apertures in the outer casing 36 to the first manifold 52 for channeling the pressurized cooling air thereto. A plurality of second supply tubes 72 extends radially through apertures in the outer casing 36 to the second manifold 54 for channeling the pressurized purge air thereto.

Each of the first tubes 70 includes a corresponding one of the control valves 58 for modulating airflow therethrough as synchronized by the controller 60 joined thereto. The second tubes 72 are without flow modulation valves for full time channeling of the compressor bleed air during all portions of the engine operating cycle.

The bleed circuit 56 also includes a common supply manifold 74 surrounding the outer casing 36 and joined in flow communication with the high pressure compressor 18 by a plurality of bleed tubes 76. The bleed tubes collectively channel the same pressure bleed air from the compressor to the common supply manifold 74, and the several first and second supply tubes 70,72 extend from the common supply manifold to channel the same pressure air to the corresponding first and second manifolds 52,54.

In this way, the same source bleed air may be distributed uniformly around the circumference of the outer casing to feed the corresponding supply tubes and different portions of the two manifolds 52,54 for ensuring circumferential uniformity of vane cooling and cavity purging.

The exemplary sheet metal septum 68 is illustrated in different views in FIGS. 2–4 and preferably has a two-ply construction with outer and inner plies suitably joined together along corresponding edges thereof, and radially spaced apart to define the first manifold 52 therebetween. Correspondingly, the second manifold 54 is defined radially between the outer ply of the septum and the outer casing 36.

As shown in FIG. 2 each of the bypass tubes 50 has an outer end disposed in flow communication with the second manifold 54 through an aperture in the inner ply of the septum 68, and also includes an inner end extending radially inwardly through the inner band 46. This provides direct flow communication from the second manifold 54 through the inner band 46, bypassing the nozzle vane 42.

As shown in FIGS. 3 and 4, the outer ply of the septum 68 includes a plurality of inlet apertures 78 disposed in flow communication with the first supply tubes 70 for receiving the pressurized air therefrom.

Each of the bypass tubes 50 is sealingly joined to the inner ply of the septum 68 illustrated in FIG. 2 by a tubular sleeve or inner spoolie 80 joined in flow communication with the second manifold 54. The inner spoolie 80 joins the bypass tube 50 in direct flow connection with the second manifold 54 to bypass the first manifold 52 and the portion thereof immediately surrounding the several nozzle vanes.

An outer tubular sleeve or spoolie 82 joins each of the first supply tubes 70 to the outer ply of the septum 68 as illustrated in FIG. 4 to provide direct flow communication with the first manifold 52 bypassing the surrounding second manifold 54. In this way, the first supply tubes 70 may be directly joined to the first manifold 52, with the second manifold 54 being directly joined to the second supply tubes 72 for receiving the pressurized air therefrom, and transferring that air through the inner spoolies 80 to the corresponding bypass tubes 50.

The two-ply septum 68 provides a convenient and simply mechanism to define the independent manifolds 52,54 and the corresponding parallel flowpaths for cooling the nozzle vanes, while also bypassing those vanes with the pressurized purge air channeled inwardly therethrough to the forward rotor cavity 64. As shown in FIGS. 2 and 3, the septum 68 preferably has a single ply over the forward or leading edge ends of the nozzle vanes 42, and suitably supports the inner spoolies 80 in corresponding tubular seats therein. The septum 68 is also two-ply circumferentially between the forward ends of the vanes, and supports the outer spoolies in corresponding tubular seats in the outer ply thereof as illustrated in FIG. 4.

As shown individually in FIGS. 2 and 4 and collectively in FIG. 3, the septum 68 is also two-ply circumferentially between and over the aft or trailing edge ends of the row of nozzle vanes 42 for providing a circumferentially continuous first manifold 52 over a plurality of adjacent vanes. FIG. 3 illustrates the castellated or serpentine form of the two-ply septum 68 which maintains circumferential continuity of the first manifold 52, while also providing in the single-ply portions of the septum convenient apertures or seats for mounting the inner spoolies 80 joined to the underlying bypass tubes 50.

As best illustrated in cutaway view in FIG. 3, the inner ply of the septum 68 is perforate and includes a multitude or large number of closely spaced apart impingement holes 84 disposed along the first manifold 52 for first discharging the pressurized air therefrom to impingement cool the underlying outer band 44 of the nozzle. The common septum 68 therefore provides a convenient manner for introducing the independent first and second manifolds 52,54 in the available space between the outer casing 36 and the outer band, while also providing a convenient member for introducing the impingement holes 84 for impingement cooling the outer band.

As shown in FIG. 4, each of the nozzle vanes 42 preferably includes a perforate impingement insert or baffle 86 suitably mounted inside the plenum 48 and having a tubular inlet 88 extending radially outwardly through the outer band 46. The inlet 88 surrounds a corresponding bypass tube 50 for receiving spent impingement air initially discharged through the impingement holes 84 of the septum inner ply.

In this way, the septum 68 may be conveniently used for impingement cooling the outer surface of the outer band prior to routing the spent impingement air inside the vane impingement baffle 86. The impingement baffle also includes a multitude of impingement holes which provide a second series of impingement cooling of the inner surface of the nozzle vane.

The spent impingement air may be discharged from inside each nozzle vane through one or more rows of conventional film cooling holes 90 extending through the pressure or suction sides thereof, or both sides. The modulated cooling air may therefore be channeled through the first manifold 52 into the corresponding nozzle vanes 42 for cooling thereof, and then discharged through film cooling holes 90 for return to the combustion gas flowpath between nozzle vanes.

In alternate embodiments, the impingement baffle 86 may be omitted from each vane 42 in lieu of any other conventional cooling circuit therein, such as internal convection and serpentine cooling.

As shown in FIG. 2 the inner band 46 includes an integral manifold 92 extending circumferentially therealong and disposed in flow communication with the several bypass tubes 50. The inner manifold includes a row of discharge holes 94 facing the forward rotor cavity 64 for discharging the purge air thereto.

The inner manifold 92 preferably supports a conventional honeycomb seal 96 closely adjacent to the labyrinth seal teeth of the interstage seal 62 and separates the forward and aft rotor cavities 64,66. The common septum 68 separates the first and second manifolds 52,54 and permits a direct flowpath through the individual vanes bypassing the internal cooling circuits thereof for providing the pressurized purge air through the inner manifold 92 directly to the forward rotor cavity 64.

In this configuration, the unmodulated purge air is channeled directly through the outer band 44 and through the row of nozzle vanes to purge the forward cavity 64, and in turn the aft cavity 66 using the pressurized purge air. In contrast, the pressurized cooling air channeled to the first manifold 52 is modulated by the control valves 58, and may be first channeled in impingement against the outer band 44 for impingement cooling thereof followed in turn by routing into the plenums 48 of the nozzle vanes for impingement cooling thereof from the impingement baffle 86.

Figure 5:
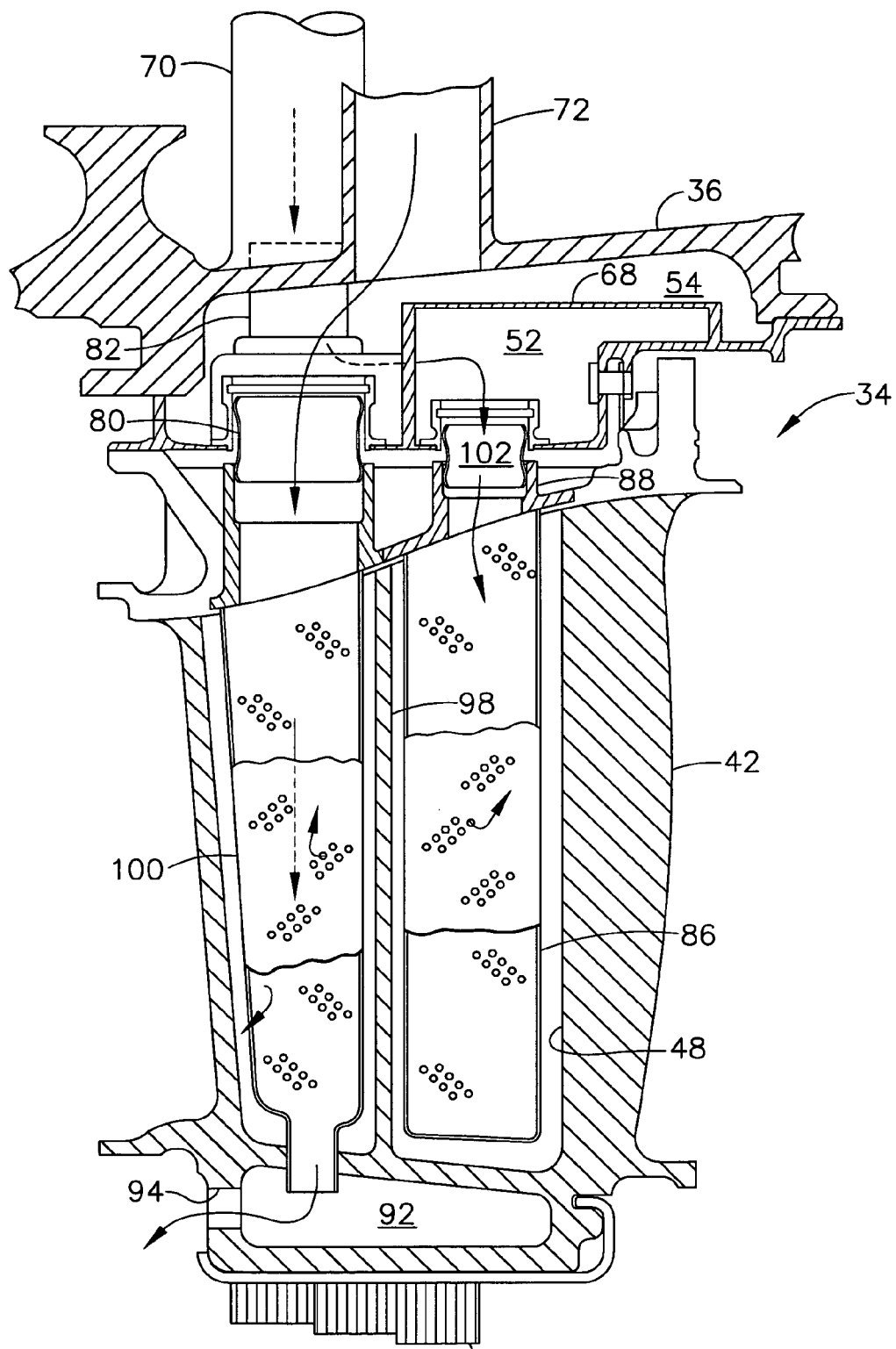
FIG. 5 is an axial sectional view, like FIG. 2, of another embodiment of the second stage turbine nozzle.

FIG. 5 illustrates a modification of the modulated second stage turbine nozzle 34. In this embodiment, each of the vanes 42 includes an imperforate transverse rib or partition 98 integrally joined to the opposite pressure and suction sides of the vane for dividing the plenum 48 into forward and aft cavities or channels.

Correspondingly, the bypass tube is in the modified form of a forward impingement insert or baffle 100 disposed inside the forward channel. The top end of the forward tube baffle 100 extends through the outer band for receiving the inner spoolie 80 as described above. The bottom end of the forward tube baffle 100 extends through the inner band in flow communication with the inner manifold as also described above.

The forward baffle 100 includes a multitude of impingement holes for impingement cooling the inner surface of the forward channel, with a portion of the pressurized air being channeled therethrough still bypassing the vane itself for direct flow to the inner manifold 92 for continuously purging the forward and aft cavities as further described above.

In this embodiment, the partition 98 divides the plenum 48 near the midchord of the vane for separately cooling the forward and aft portions thereof. In this way, full pressure cooling air may be continuously supplied to the forward channel for maintaining adequate backflow margin relative to the combustion gases flowing outside the vanes. The spent impingement air in the forward channel is discharged through the film cooling holes 90 as disclosed above with a backflow margin unaffected by modulation of the cooling air in the aft channel.

The aft channel of the plenum 48 preferably includes its own aft impingement baffle 86 having the inlet 88 through the outer band 44 as described above. An aft spoolie 102 may be used to join the first manifold 52 in flow communication with the inlet 88 of the aft impingement baffle 86 and provide modulated cooling air directly thereto.

In this embodiment, the two-ply septum 68 may otherwise remain imperforate without impingement holes therein, except for the apertures required for the three different spoolies 80,82,102. The three spoolies provide convenient flow connections between the common two-ply septum 68 and the modulated first supply tubes 70 on the inlet side thereof, and with the forward and aft impingement baffles 100,86 on the outlet side thereof.

The second stage turbine nozzle disclosed above in exemplary embodiments introduces the common septum 68 and bypass tubes 50 for providing two independent and parallel flowpaths through the common nozzle vanes. The modulated cooling air flowpath defined through the first manifold 52 provides modulated cooling of the nozzle vanes 42 and the supporting outer bands. The non-modulated purge air flowpath defined by the second manifold 54 and cooperating bypass tubes 50 directly bypasses the purge air through the individual nozzle vanes to purge the forward rotor cavity 64.

In this way, full time purge air is provided to the forward and aft rotor cavities 64,66, while modulated cooling air is provided to the individual nozzle vanes 42. During cruise operation of the turbofan engine powering an aircraft in flight, cooling airflow to the individual vanes may be selectively reduced when permitted by the operating parameters of the engine for temporarily reducing the amount of cooling air supplied thereto. Since cruise operation of the aircraft is a typically long duration at reduced power setting of the engine, the temporary reduction of cooling air provided to the nozzle vanes permits a substantial decrease in fuel consumption.

When tailoring of the backflow margin is desired within each vane, the dividing partition 98 may be introduced to provide modulated cooling of the aft vane portion, and non-modulated cooling of the forward vane portion, along with full-time bypassing of the purge air through the forward vane portion to the inner manifold for purging of the forward and aft rotor cavities.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A gas turbine engine comprising:
   a compressor joined to a turbine for being powered thereby;
   said turbine including a nozzle having a row of hollow vanes extending radially between outer and inner bands, and said outer band is supported in an annular outer casing;
   each of said vanes having an internal cooling plenum, and a bypass tube extending through said outer and inner bands;
   a two-ply septum disposed radially between said outer casing and said outer band, and defining independent first and second manifolds;
   said first manifold surrounding said outer band and disposed in flow communication with said plenums of said vanes;
   said second manifold surrounding said first manifold and disposed in flow communication with said bypass tubes of said vanes;
   a bleed circuit disposed in flow communication between said compressor and said first and second manifolds for channeling pressurized air therebetween; and
   a control valve disposed between said bleed circuit and said first manifold for modulating flow of said pressurized cooling air into said vane plenums.

2. An engine according to claim 1 wherein said first and second manifolds are disposed in parallel flow from said bleed circuit, and said second manifold is directly joined to said bleed circuit without a flow modulation valve.

3. An engine according to claim 2 wherein said septum comprises outer and inner plies spaced apart radially to define said first manifold therebetween, with said second manifold being defined radially between said outer ply and said outer casing.

4. An engine according to claim 3 wherein each of said bypass tubes has an outer end disposed in flow communication with said second manifold through said septum, and an inner end extending through said inner band.

5. An engine according to claim 4 wherein said septum outer ply includes a plurality of apertures disposed in flow communication with said second supply tubes.

6. An engine according to claim 5 further comprising:
   an inner spoolie joining each of said bypass tubes to said septum in flow communication with said second manifold; and
   an outer spoolie joining each of said second supply tubes to said septum in flow communication with said first manifold.

7. An engine according to claim 6 wherein said septum is single ply over forward ends of said vanes, and supports said inner spoolies therein, and is two-ply circumferentially between said forward ends of said vanes and supports said outer spoolies in said outer ply thereof.

8. An engine according to claim 7 wherein said septum is two-ply circumferentially between and over aft ends of said vanes for providing a circumferentially continuous first manifold over a plurality of adjacent vanes.

9. An engine according to claim 8 wherein:
   said septum inner ply includes a multitude of impingement holes along said first manifold for discharging said pressurized air therefrom to impingement cool said outer band; and
   each of said vanes includes an impingement baffle inside said plenum 48 thereof having an inlet through said outer band surrounding a corresponding bypass tube for receiving spent impingement air discharged through said impingement holes.

10. An engine according to claim 8 wherein:
    each of said vanes includes a partition dividing said plenum into forward and aft channels;
    said bypass tube comprises a forward impingement baffle disposed inside said forward channel;
    said aft channel includes an aft impingement baffle having an inlet through said outer band; and
    an aft spoolie joins said first manifold in flow communication with said inlet of said aft impingement baffle.

11. A gas turbine engine comprising:
    a compressor joined to a turbine for being powered thereby;
    said turbine including a nozzle having a row of hollow vanes extending radially between outer and inner bands;
    each of said vanes having an internal cooling plenum, and a bypass tube extending through said outer and inner bands;
    a first manifold surrounding said outer band and disposed in flow communication with said plenums of said vanes;
    a second manifold surrounding said first manifold and disposed in flow communication with said bypass tubes of said vanes;
    a bleed circuit disposed in flow communication between said compressor and first and second manifolds for channeling pressurized air therebetween; and
    a control valve disposed between said bleed circuit and first manifold for modulating flow of said pressurized air into said vane plenums.

12. An engine according to claim 11 wherein said first and second manifolds are disposed in parallel flow from said bleed circuit, and said second manifold is directly joined to said bleed circuit without a flow modulation valve.

13. An engine according to claim 12 further comprising an annular outer casing supporting said nozzle, and a septum disposed radially therebetween to separate radially said first and second manifolds.

14. An engine according to claim 13 wherein said bleed circuit comprises:
    a plurality of first supply tubes extending through said casing to said first manifold for channeling said pressurized air thereto; and
    a plurality of second supply tubes extending through said casing to said second manifold for channeling said pressurized air thereto.

15. An engine according to claim 14 wherein said each of said first tubes includes a corresponding one of said control valves for modulating airflow therethrough.

16. An engine according to claim 15 wherein said bleed circuit further comprises a common supply manifold joined in flow communication with said compressor, and said first and second tubes extend therefrom to said first and second manifolds, respectively.

17. An engine according to claim 15 wherein said septum comprises outer and inner plies spaced apart radially to define said first manifold therebetween, with said second manifold being defined radially between said outer ply and said outer casing.

18. An engine according to claim 17 wherein each of said bypass tubes has an outer end disposed in flow communication with said second manifold through said septum, and an inner end extending through said inner band.

19. An engine according to claim 18 wherein said septum outer ply includes a plurality of apertures disposed in flow communication with said second supply tubes.

20. An engine according to claim 19 further comprising:
an inner spoolie joining each of said bypass tubes to said septum in flow communication with said second manifold; and
an outer spoolie joining each of said second supply tubes to said septum in flow communication with said first manifold.

21. An engine according to claim 20 wherein said septum is single ply over forward ends of said vanes, and supports said inner spoolies therein, and is two-ply circumferentially between said forward ends of said vanes and supports said outer spoolies in said outer ply thereof.

22. An engine according to claim 21 wherein said septum is two-ply circumferentially between and over aft ends of said vanes for providing a circumferentially continuous first manifold over a plurality of adjacent vanes.

23. An engine according to claim 22 wherein said septum inner ply includes a multitude of impingement holes along said first manifold for discharging said pressurized air therefrom to impingement cool said outer band.

24. An engine according to claim 23 wherein each of said vane plenums includes an inlet through said outer band surrounding a corresponding bypass tube for receiving spent impingement air discharged through said impingement holes.

25. An engine according to claim 23 wherein each of said vanes includes an impingement baffle inside said plenum thereof having an inlet through said outer band surrounding a corresponding bypass tube for receiving spent impingement air discharged through said impingement holes.

26. An engine according to claim 22 wherein:
each of said vanes includes a partition dividing said plenum into forward and aft channels;
said bypass tube comprises a forward impingement baffle disposed inside said forward channel; and
said aft channel includes an aft impingement baffle having an inlet through said outer band.

27. An engine according to claim 26 further comprising an aft spoolie joining said first manifold in flow communication with said inlet of said aft impingement baffle.

28. An engine according to claim 15 further comprising:
a first stage nozzle and first stage rotor disk disposed forward of said turbine nozzle to define a forward cavity therebetween;
a second stage rotor disk disposed aft of said turbine nozzle to define an aft cavity therebetween; and
said bypass tubes extend through said inner band in flow communication with said forward cavity for discharging said pressurized air channeled therethrough.

29. An engine according to claim 28 wherein said inner band includes an inner manifold disposed in flow communication with said bypass tubes, and said inner manifold includes a row of discharge holes facing said forward cavity.

30. A method of cooling a turbine nozzle in a gas turbine engine having a row of hollow nozzle vanes extending radially between outer and inner bands and disposed axially between first and second turbine rotor disks comprising:
channeling pressurized purge air from a compressor in said engine radially through said vanes to purge forward and aft cavities located between said nozzle inner band and said first and second disks, respectively;
channeling pressurized cooling air from said compressor and inside said vanes to cool said vanes independently from said purge air; and
modulating flowrate of said cooling air inside said vanes without modulating flowrate of said purge air through said vanes.

31. A method according to claim 30 further comprising channeling said purge air and cooling air from said compressor in parallel flowpaths through said vanes isolated from each other through said outer band.

32. A method according to claim 31 wherein:
said purge air is channeled directly through said outer band to purge said forward and aft cavities; and
said cooling air is first channeled in impingement against said outer band for impingement cooling thereof followed in turn by routing into said vanes for internal impingement cooling thereof.

* * * * *